US012764584B2

(12) United States Patent
Yang

(10) Patent No.: US 12,764,584 B2
(45) Date of Patent: Oct. 13, 2026

(54) RELAY TERMINAL DEVICE MEASUREMENT REPORTING METHOD, AND APPARATUS

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 302 days.

(21) Appl. No.: 18/580,117

(22) PCT Filed: Jul. 19, 2021

(86) PCT No.: PCT/CN2021/107196
§ 371 (c)(1),
(2) Date: Jan. 17, 2024

(87) PCT Pub. No.: WO2023/000149
PCT Pub. Date: Jan. 26, 2023

(65) Prior Publication Data

US 2024/0340674 A1 Oct. 10, 2024

(51) Int. Cl.

| | |
|---|---|
| ***H04W 24/10*** | (2009.01) |
| ***H04B 17/318*** | (2015.01) |
| ***H04W 8/00*** | (2009.01) |
| *H04W 92/18* | (2009.01) |

(52) U.S. Cl.
CPC .......... *H04W 24/10* (2013.01); *H04B 17/328* (2023.05); *H04W 8/005* (2013.01); *H04W 92/18* (2013.01)

(58) Field of Classification Search
CPC .... H04B 7/14; H04B 7/18513; H04B 17/328; H04W 40/22; H04W 40/246; H04W 48/16; H04W 8/005; H04W 76/11; H04W 84/047; H04W 76/14; H04W 92/18; H04W 36/03; H04W 88/04; H04W 24/10; H04W 24/08; H04W 36/00837; H04W 36/00835; H04W 36/033; H04W 36/0058
See application file for complete search history.

(56) References Cited

U.S. PATENT DOCUMENTS

| | | | | |
|---|---|---|---|---|
| 2018/0123682 A1* | 5/2018 | Jung | ..................... | H04W 40/22 |
| 2018/0132161 A1* | 5/2018 | Lee | ....................... | H04W 36/30 |
| 2018/0139667 A1 | 5/2018 | Yu et al. | | |

(Continued)

FOREIGN PATENT DOCUMENTS

| | | |
|---|---|---|
| CN | 102469410 A | 5/2012 |
| CN | 105657643 A | 6/2016 |

(Continued)

OTHER PUBLICATIONS

PCT/CN2021/107196 International Search Report dated Mar. 30, 2022, 4 pages.

(Continued)

*Primary Examiner* — Kwang B Yao
(74) *Attorney, Agent, or Firm* — Cozen O'Connor

(57) ABSTRACT

A method for reporting a measurement of a relay terminal device. The method includes: sending first indication information to a network device, in which the first indication information is configured to indicate information of a specified relay terminal device.

20 Claims, 4 Drawing Sheets

(56) References Cited

U.S. PATENT DOCUMENTS

| | | | | |
|---|---|---|---|---|
| 2020/0052775 | A1* | 2/2020 | Nam | H04B 7/15592 |
| 2021/0037446 | A1* | 2/2021 | Wu | H04W 48/12 |
| 2021/0360503 | A1* | 11/2021 | Lu | H04W 36/36 |
| 2022/0104097 | A1* | 3/2022 | Hu | H04W 36/362 |
| 2022/0416881 | A1* | 12/2022 | Paladugu | H04W 48/16 |
| 2023/0284206 | A1* | 9/2023 | Hoang | H04W 72/1263<br>370/329 |
| 2023/0292233 | A1* | 9/2023 | Cheng | H04W 76/14 |
| 2024/0048230 | A1* | 2/2024 | Paladugu | H04B 7/14 |
| 2024/0171959 | A1* | 5/2024 | Chang | H04B 17/328 |

FOREIGN PATENT DOCUMENTS

| | | | |
|---|---|---|---|
| CN | 111586765 | A | 8/2020 |
| WO | WO 2017028013 | A1 | 2/2017 |
| WO | WO 2017030572 | A1 | 2/2017 |

OTHER PUBLICATIONS

ERICSSON “Remaining aspects for relay selection and reselection” 3GPP TSG-RAN WG2 #112e, R2-2009229, Nov. 2020, 6 pages.

* cited by examiner

RELAY TERMINAL DEVICE MEASUREMENT REPORTING METHOD, AND APPARATUS

CROSS-REFERENCE TO RELATED APPLICATION

This application is a U.S. national phase application of International Application No. PCT/CN2021/107196, filed on Jul. 19, 2021, the content of which is hereby incorporated by reference in its entirety.

TECHNICAL FIELD

The disclosure relates to a field of wireless communication technologies, in particular to a method and an apparatus for reporting a measurement of a relay terminal device.

BACKGROUND

In a communication system, a terminal device may not directly communicate with a network device, but may communicate with the network device through another terminal device acting as a relay. The terminal device that is not connected to the network device is called remote terminal device, and the terminal device that provides a relay function is called relay terminal device.

Usually, when the remote terminal device communicates with the relay terminal device, the remote terminal device will report a channel quality of a channel between the relay terminal device and the remote terminal device to the network device, and then the network device can select a target relay terminal device for the remote terminal device according to the channel quality of the relay terminal device. However, this method for selecting the target relay terminal device cannot ensure service continuity during movement of the remote terminal device.

SUMMARY

Embodiments of the disclosure provide a method for reporting a measurement of a relay terminal and an apparatus for reporting a measurement of a relay terminal, which can be applied to the field of communication technologies.

According to a first aspect of embodiments of the disclosure, a method for reporting a measurement of a relay terminal device is provided. The method is performed by a remote terminal device. The method includes: sending first indication information to a network device, in which the first indication information is configured to indicate information of a specified relay terminal device.

According to a second aspect of embodiments of the disclosure, a method for reporting a measurement of a relay terminal device is provided. The method is performed by a network device. The method includes: receiving first indication information sent by a remote terminal device, in which the first indication information is configured to indicate information of a specified relay terminal device.

According to a third aspect of embodiments of the disclosure, a communication apparatus is provided. The communication apparatus includes: a processor and a memory having computer programs stored thereon. When the computer programs stored in the memory are executed by the processor, the communication apparatus is caused to implement the method described in the first aspect above.

According to a fourth aspect of embodiments of the disclosure, a communication apparatus is provided. The communication apparatus includes: a processor and a memory having computer programs stored thereon. When the computer programs stored in the memory are executed by the processor, the communication apparatus is caused to implement the method described in the second aspect above.

BRIEF DESCRIPTION OF THE DRAWINGS

In order to clearly illustrate technical solutions of embodiments of the disclosure or background technologies, the accompanying drawings used in the embodiments or the background technologies will be explained below.

DETAILED DESCRIPTION

In order to better understand the method for reporting a measurement of a relay terminal device provided in the embodiments of the disclosure, a communication system used in the embodiments of the disclosure is first described below.

Figure 1:
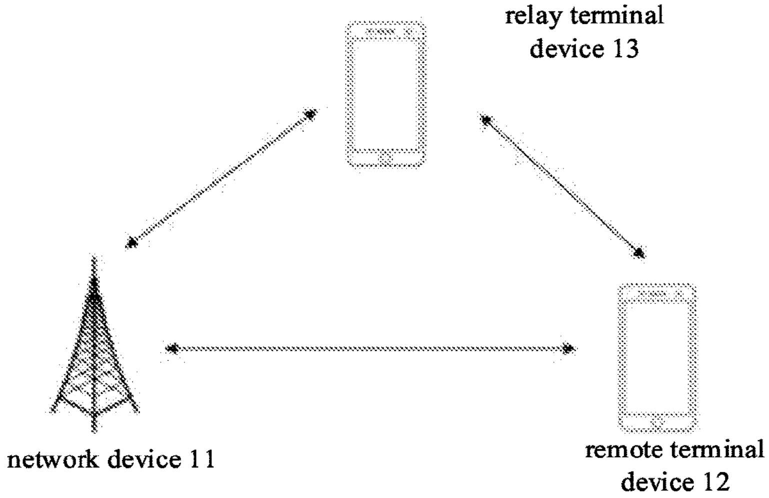
FIG. 1 is a schematic diagram of a communication system according to an embodiment of the disclosure.

As illustrated in FIG. 1, FIG. 1 is a block diagram of a communication system provided by an embodiment of the disclosure. The communication system may include, but is not limited to, a network device, a remote terminal device and a relay terminal device. The number and form of devices shown in FIG. 1 are only for examples and do not constitute a limitation on the embodiments of the disclosure, and the communication system may include two or more network devices, two or more remote terminal devices and two or more relay terminal devices in practical applications. The communication system shown in FIG. 1 includes, for example, a network device 11, a remote terminal device 12 and a relay terminal device 13.

It should be noted that the technical solutions of the embodiments of the disclosure can be used in various communication systems, such as, a long term evolution (LTE) system, a 5th generation (5G) mobile communication system, a 5G new radio (NR) system, or other future new mobile communication systems.

The network device 11 in the embodiments of the disclosure is an entity on a network side for transmitting or receiving signals. For example, the network device 11 may be an evolved NodeB (eNB), a transmission reception point (TRP), a next generation NodeB (gNB) in the NR system, a base station in other future mobile communication systems, or an access node in a wireless networking (WiFi™) system. The specific technology and specific device form adopted by the network device are not limited in the embodiments of the disclosure. The network device provided by the embodiments of the disclosure may be composed of a central unit (CU) and a distributed unit (DU). The CU may also be called a control unit. The CU-DU structure allows a protocol layer of the network device, such as a base station, to be split, some functions of the protocol layer are placed in the CU for centralized control, and some or all of the remaining functions of the protocol layer are distributed in the DU, which is intensively controlled by the CU.

Each of the remote terminal device 12 and the relay terminal device 13 in the embodiments of the disclosure is an entity on a user side for receiving or transmitting signals, such as a cellular phone. The terminal device may also be referred to as a terminal, a user equipment (UE), a mobile station (MS), a mobile terminal (MT), and the like. The terminal device can be a car with a communication function, a smart car, a mobile phone, a wearable device, a Pad, a computer with a wireless transceiver function, a virtual reality (VR) terminal device, an augmented reality (AR) terminal device, a wireless terminal device in the industrial control, a wireless terminal device in the self-driving, a wireless terminal device in the remote medical surgery, a wireless terminal device in the smart grid, a wireless terminal device in the transportation safety, a wireless terminal device in the smart city, a wireless terminal device in the smart home, etc. The specific technology and specific device form adopted by the terminal device are not limited in the embodiments of the disclosure.

It is understood that the communication system described in the embodiments of the disclosure is intended to more clearly illustrate the technical solutions of the embodiments of the disclosure, and does not constitute a limitation on the technical solutions provided by the embodiments of the disclosure. It is understood by those skilled in the art that as the system architecture evolves and new business scenarios emerge, the technical solutions provided by the embodiments of the disclosure are also applicable to similar technical problems.

A method for reporting a measurement of a relay terminal device and an apparatus for reporting a measurement of a relay terminal device will be introduced in detail below with reference to the accompanying drawings.

Figure 2:
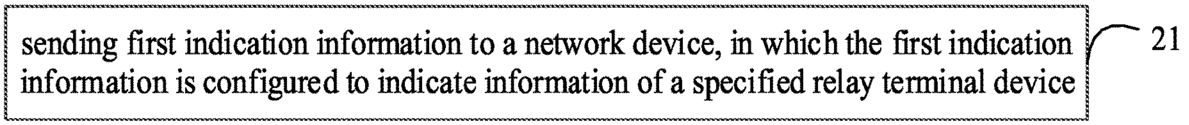
FIG. 2 is a flowchart of a method for reporting a measurement of a relay terminal device executed by a remote terminal device according to an embodiment of the disclosure.

As illustrated in FIG. 2, FIG. 2 is a flowchart of a method for reporting a measurement of a relay terminal device according to an embodiment of the disclosure. The method is executed by a remote terminal device. As illustrated in FIG. 2, the method includes, but is not limited to the following steps.

At step 21, first indication information is sent to a network device, in which the first indication information is configured to indicate information of a specified relay terminal device.

Alternatively, the information of the specified relay terminal device includes at least one of:

an identification (ID) of the relay terminal device;

an ID of a serving cell of the relay terminal device;

information on whether the serving cell of the relay terminal device is identical to a serving cell of the remote terminal device; or a measurement result of the relay terminal device.

Alternatively, the ID of the serving cell of the relay terminal device includes at least one of: an ID of a cell where a relay terminal device in an idle state or an inactive state resides; and an ID of a cell connected to a relay terminal device in a connected state.

The ID of the relay terminal device can be an ID of the relay terminal device whose serving cell is the same as its own serving cell selected by the remote terminal device from the IDs of the serving cells of multiple relay terminal devices.

Alternatively, there may be one or more IDs of relay terminal devices in the first indication information, and there may be one or more IDs of serving cells of the relay terminal devices in the first indication information. Moreover, there may be one or more measurement results of the relay terminal devices in the first indication information, which is not limited in the disclosure.

The remote terminal device may determine whether the serving cell of the relay terminal device is the same as the serving cell of the remote terminal device according to the ID of the serving cell of the relay terminal device.

Alternatively, if the serving cell of the relay terminal device is the same as the serving cell of the remote terminal device, the relay terminal device may be marked with a special character. For example, in the first indication information, the corresponding serving cell of the relay terminal device marked with "1" is the same as the serving cell of the remote terminal device. Correspondingly, if the serving cell of the relay terminal device is different from the serving cell of the remote terminal device, the relay terminal device is marked with "0" in the first indication information, which is not limited in the disclosure.

The measurement result of the relay terminal device may include a channel quality of a channel between the remote terminal device and the relay terminal device. For example, the measurement result may be a Reference Signal Receiving Power (RSRP) of a discovery signal for a sidelink communication between the remote terminal device and the relay terminal device, which is not limited in the disclosure.

In the disclosure, in order to avoid the problem of poor service continuity during movement of the remote terminal device, which may occur due to the fact that a serving cell of the remote terminal device after the movement is different from a serving cell of the relay terminal device, the remote terminal device can directly send the selected ID of the relay terminal whose serving cell is the same as its own serving cell to the network device; or the remote terminal device can send the measured information of the serving cells of respective relay terminal devices to the network device, and the network device screens out the relay terminal device whose serving cell is the same as the serving cell of the remote terminal device, to ensure that the remote terminal device is always connected to the network device through the relay terminal device whose serving cell is the same as its own serving cell, which effectively avoids the problem of poor service continuity and improves the service quality of the remote terminal device.

By implementing the embodiments of the disclosure, the remote terminal device sends the first indication information to the network device. The first indication information is used to indicate information of a specified relay terminal device. In this way, the remote terminal device sends the information of the specified relay terminal device to the network device, so that the serving cell of the target relay terminal device configured by the network device for the remote terminal device is the same as the serving cell of the remote terminal device, thus ensuring the service continuity of the remote terminal device.

Figure 3:
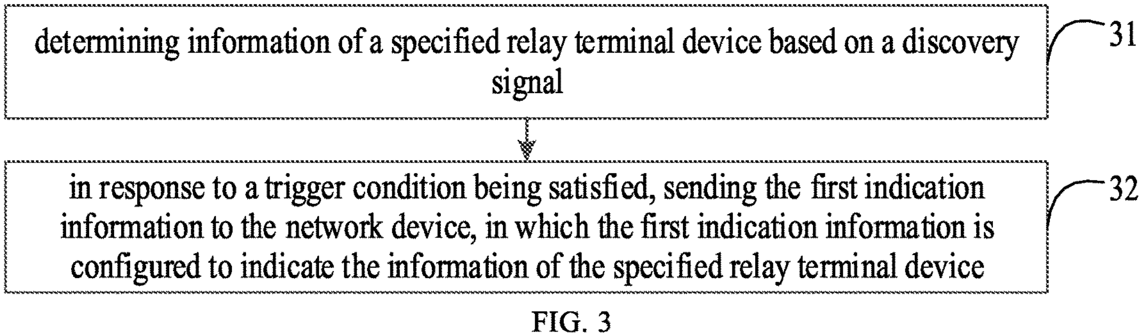
FIG. 3 is a flowchart of a method for reporting a measurement of a relay terminal device executed by a remote terminal device according to an embodiment of the disclosure.

As illustrated in FIG. 3, FIG. 3 is a flowchart of a method for reporting a measurement of a relay terminal device according to an embodiment of the disclosure. The method is executed by a remote terminal device. As illustrated in FIG. 3, the method includes, but is not limited to the following steps.

At step 31, information of a specified relay terminal device is determined based on a discovery signal.

The remote terminal device and the relay terminal device can find each other through the discovery signal, and the discovery signal of the relay terminal device can carry an ID of a serving cell, so that the remote terminal device can determine the information of the specified relay terminal device.

At step 32, in response to a trigger condition being satisfied, first indication information is sent to a network device, in which the first indication information is configured to indicate the information of the specified relay terminal device.

In the disclosure, in order to avoid occupation of excessive resources by the first indication information, the remote terminal device may send the first indication information to the network device only after the trigger condition is satisfied, so that the network device can determine the relay terminal device to be accessed for the remote terminal device in a timely manner. Therefore, the problem of poor service continuity of the remote terminal device during movement due to the fact that the serving cell of the remote terminal device after movement is different from the serving cell of the relay terminal device may be avoided, so as to ensure the service continuity of the remote terminal device.

Alternatively, the remote terminal device may determine the trigger condition according to a protocol.

Alternatively, the trigger condition may include: a specified transmission cycle, and/or, detection of a trigger event.

The specified transmission cycle may be a transmission cycle indicated by the network device, or may be a transmission cycle determined according to the protocol, or may be a transmission cycle determined after negotiation between the terminal device and the network device, which is not limited in the disclosure.

It is understood that the remote terminal device may periodically send the first indication information to the network device based on the specified transmission cycle, or may send the first indication information to the network device when detecting the trigger event.

Alternatively, the trigger event includes at least one of:

a RSRP of a discovery signal being greater than a first threshold;

a RSRP of a sidelink communication signal being greater than a second threshold;

information of a serving cell of the specified relay terminal device being changed;

the serving cell of the specified relay terminal device being included in a specified cell list; or the serving cell of the specified relay terminal device being identical to a serving cell of the remote terminal device.

Alternatively, the remote terminal device can determine the specified cell list according to the protocol, or can determine the specified cell list according to an instruction of the network device.

The remote terminal device may also determine the specified cell list according to the serving cell where the remote terminal device is currently located.

Alternatively, the base station to which the serving cell where the remote terminal is currently located belongs is determined firstly, and then each cell covered by the base station is determined as a cell included in the specified cell list.

The information of the serving cell of the specified relay terminal device being changed means that the serving cell of the relay terminal device is changed, or the changed serving cell of the relay terminal device is not included in the specified cell list, which is not limited in the disclosure.

For example, if the remote terminal device determines that any reported serving cell of the relay terminal device has changed, for example, from serving cell A to serving cell B, the remote terminal device may send the first indication information to the network device.

Alternatively, if the remote terminal device determines that any reported serving cell of the relay terminal device that has been changed is not included in the specified cell list, the relay terminal device may send the first indication information to the network device. For example, the specified cell list includes serving cell A and serving cell B, and when the relay terminal device switches from serving cell A to serving cell C, the remote terminal device is required to send the first indication information to the network device. By implementing the embodiments of the disclosure, the remote terminal device determines the information of the specified relay terminal device according to the discovery signal, sends the first indication information to the network device in response to the trigger condition being satisfied, and then receives fourth indication information sent by the network device. The fourth indication information is used to indicate a relay terminal device to be accessed. Therefore, the remote terminal device sends the information of the specified relay terminal device to the network device in a timely manner when the trigger condition is satisfied, so that the network device can configure the relay terminal device to be accessed for the remote terminal device in a timely manner, thereby ensuring the service continuity of the remote terminal device.

Figure 4:
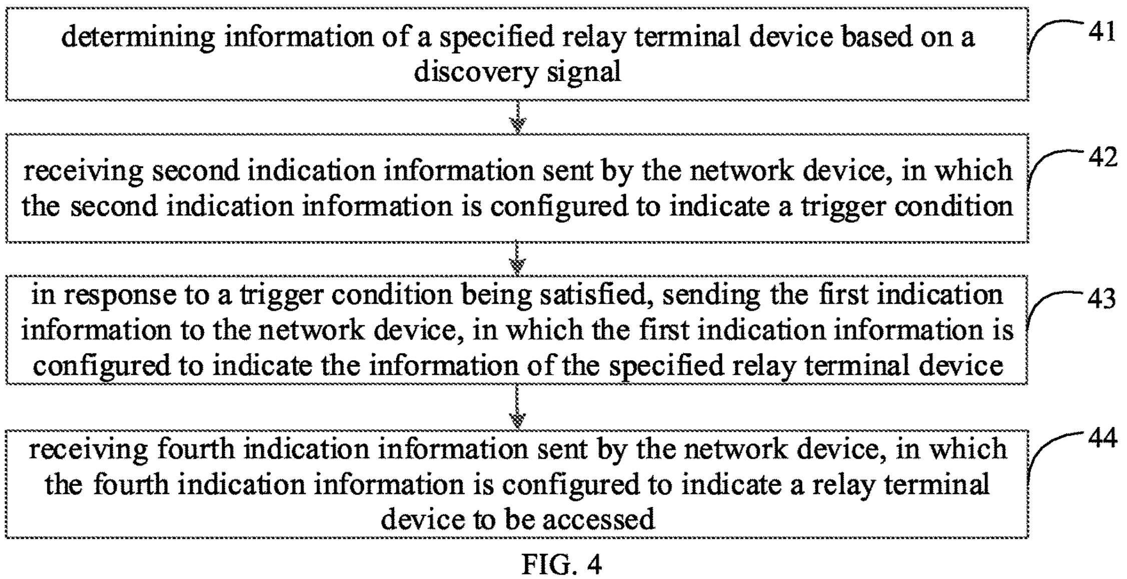
FIG. 4 is a flowchart of a method for reporting a measurement of a relay terminal device executed by a remote terminal device according to an embodiment of the disclosure.

As illustrated in FIG. 4, FIG. 4 is a flowchart of a method for reporting a measurement of a relay terminal device according to an embodiment of the disclosure. The method is executed by a remote terminal device. As illustrated in FIG. 4, the method includes, but is not limited to the following steps.

At step 41, information of a specified relay terminal device is determined based on a discovery signal.

Regarding the specific implementation of the step 41, reference may be made to detailed descriptions of other embodiments of the disclosure, which will not be repeated in detail herein.

At step 42, second indication information sent by a network device is received, in which the second indication information is configured to indicate a trigger condition.

Alternatively, the remote terminal device may receive the second indication information sent by the network device via a broadcast signaling, or may receive the second indication information sent by the network device via a Radio Resource Control (RRC) message, which is not limited in the disclosure.

At step 43, in response to the trigger condition being satisfied, first indication information is sent to the network device, in which the first indication information is configured to indicate the information of the specified relay terminal device.

Regarding the specific implementation of the step 43, reference may be made to detailed descriptions of other embodiments of the disclosure, which will not be repeated in detail herein.

At step 44, fourth indication information sent by the network device is received, in which the fourth indication information is configured to indicate a relay terminal device to be accessed.

After receiving the fourth indication information sent by the network device, the remote terminal device may establish a connection with the relay terminal device to be accessed indicated in the fourth indication information, to ensure the service continuity of the communication.

By implementing the embodiments of the disclosure, after receiving the second indication information sent by the network device for indicating the trigger condition, the remote terminal device sends the first indication information to the network device when the trigger condition is satisfied, and receives the fourth indication information sent by the network device for indicating the relay terminal device to be accessed. In this way, the remote terminal device sends the information of the specified relay terminal device to the network device when the trigger condition is satisfied, to cause the network device to indicate the relay terminal device to be accessed, so that the remote terminal device can switch to the relay terminal device whose serving cell is the same as its own serving cell in a timely manner, thereby ensuring the service continuity of the remote terminal device.

Figure 5:
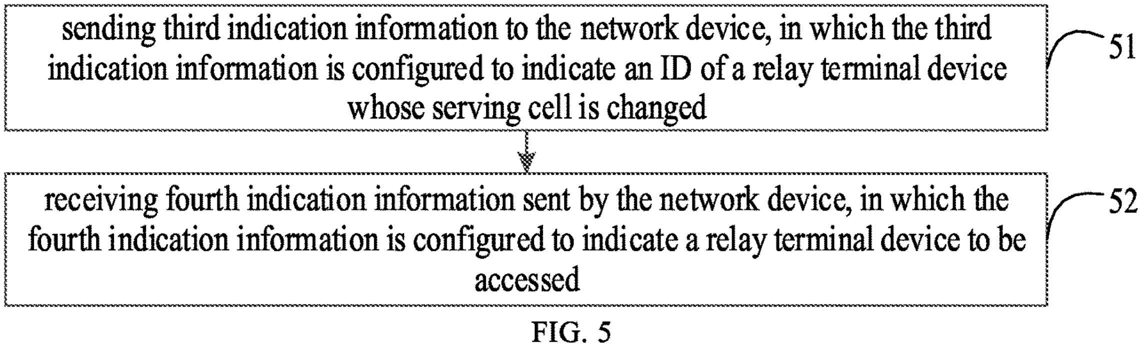
FIG. 5 is a flowchart of a method for reporting a measurement of a relay terminal device executed by a remote terminal device according to an embodiment of the disclosure.

As illustrated in FIG. 5, FIG. 5 is a flowchart of a method for reporting a measurement of a relay terminal device according to an embodiment of the disclosure. The method is executed by a remote terminal device. As illustrated in FIG. 5, the method includes, but is not limited to the following steps.

At step 51, third indication information is sent to a network device, in which the third indication information is configured to indicate an ID of a relay terminal device whose serving cell is changed.

It is understood that the remote terminal device may send the third indication information to the network device after detecting a change of the serving cell of the relay terminal device indicated in the first indication information that has been sent to the network device, so as to ensure that the information of the relay terminal device on the network device side is the same as the information on the remote terminal device side, so that the relay terminal device to be accessed may be more accurately determined for the remote terminal device according to the information of the relay terminal device.

At step 52, fourth indication information sent by the network device is received, in which the fourth indication information is configured to indicate a relay terminal device to be accessed.

Regarding the specific implementation of the step 52, reference may be made to detailed descriptions of other embodiments of the disclosure, which will not be repeated in detail herein.

By implementing the embodiments of the disclosure, the remote terminal device sends the third indication information for indicating the ID of the relay terminal device whose serving cell is changed to the network device, and receives the fourth indication information sent by the network device. The fourth indication information is used to indicate the relay terminal device to be accessed. As a result, when the serving cell of the relay terminal device is changed, the indication information can be sent to the network device in a timely manner, so that the network device can more accurately determine the relay terminal device to be accessed for the remote terminal device, which further ensures the service continuity of the remote terminal device.

Figure 6:
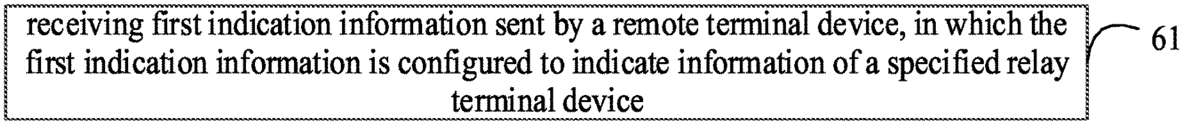
FIG. 6 is a flowchart of a method for reporting a measurement of a relay terminal device executed by a network device according to an embodiment of the disclosure.

As illustrated in FIG. 6, FIG. 6 is a flowchart of a method for reporting a measurement of a relay terminal device according to an embodiment of the disclosure. The method is executed by a network device. As illustrated in FIG. 6, the method includes, but is not limited to the following steps.

At step 61, first indication information sent by a remote terminal device is received, in which the first indication information is configured to indicate information of a specified relay terminal device.

Alternatively, the information of the specified relay terminal device includes at least one of:

an ID of a relay terminal device;

an ID of a serving cell of the relay terminal device;

information on whether the serving cell of the relay terminal device is identical to a serving cell of the remote terminal device; or a measurement result of the relay terminal device.

Alternatively, the ID of the serving cell of the relay terminal device includes at least one of: an ID of a cell where a relay terminal device in an idle state or an inactive state resides; and an ID of a cell connected to a relay terminal device in a connected state.

The ID of the relay terminal device can be an ID of the relay terminal device whose serving cell is the same as the serving cell of the remote terminal device selected by the remote terminal device from the IDs of the serving cells of multiple relay terminal devices.

Alternatively, there may be one or more IDs of relay terminal devices in the first indication information, and there may be one or more IDs of serving cells of the relay terminal devices in the first indication information. Moreover, there may be one or more measurement results of the relay terminal devices in the first indication information, which is not limited in the disclosure.

Alternatively, if "1" is used in the first indication information sent by the remote terminal to mark the relay terminal device whose the serving cell is the same as the serving cell of the remote terminal device, then the network device may determine the relay terminal device whose the serving cell is the same as the serving cell of the remote terminal device according to "1". Correspondingly, if "0" is used in the first indication information to mark the relay terminal device whose serving cell is different from the serving cell of the remote terminal device, then the network device may determine that the serving cell of the relay terminal device is different from the serving cell of the remote terminal device according to "0", which is not limited in the disclosure.

The measurement result of the relay terminal device may include a channel quality of a channel between the remote terminal device and the relay terminal device. For example, the measurement result may be a RSRP of a discovery signal for a sidelink communication between the remote terminal device and the relay terminal device, which is not limited in the disclosure.

By implementing the embodiments of the disclosure, the network device receives the first indication information sent by the remote terminal device. The first indication information is used to indicate the information of the specified relay terminal device. In this way, the network device may configure the relay terminal device whose serving cell is the same as the serving cell of the remote terminal device according to the information of the specified relay terminal device sent by the remote terminal device, so that the remote terminal device is always connected to the network device through the relay terminal device whose serving cell is the same as its own serving cell, thereby ensuring the service continuity of the remote terminal device.

Figure 7:
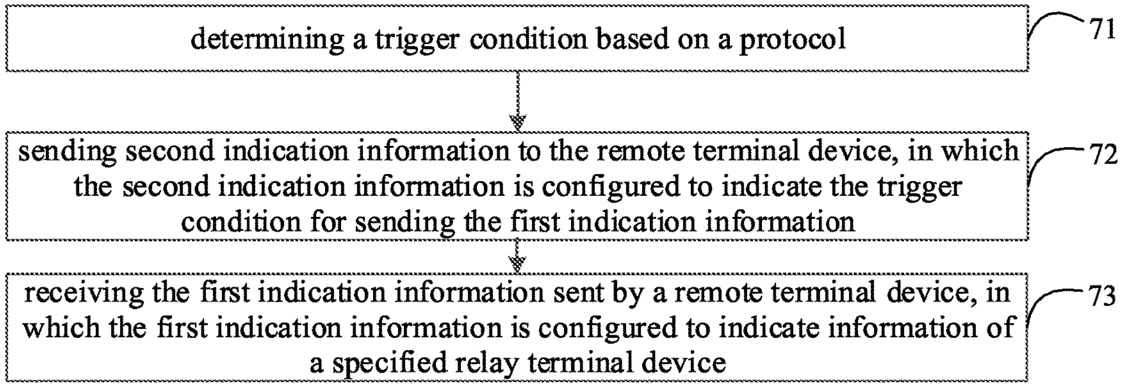
FIG. 7 is a flowchart of a method for reporting a measurement of a relay terminal device executed by a network device according to an embodiment of the disclosure.

As illustrated in FIG. 7, FIG. 7 is a flowchart of a method for reporting a measurement of a relay terminal device according to an embodiment of the disclosure. The method is executed by a network device. As illustrated in FIG. 7, the method includes, but is not limited to the following steps.

At step 71, a trigger condition is determined according to a protocol.

Alternatively, the trigger condition may include: a specified transmission cycle, and/or, detection of a trigger event.

The specified transmission cycle may be a transmission cycle indicated by the network device, or may be a transmission cycle determined according to the protocol, or may be a transmission cycle determined after negotiation between the terminal device and the network device, which is not limited in the disclosure.

Alternatively, the trigger event includes at least one of:

a RSRP of a discovery signal being greater than a first threshold;

a RSRP of a sidelink communication signal being greater than a second threshold;

information of a serving cell of the specified relay terminal device being changed;

the serving cell of the specified relay terminal device being included in a specified cell list; or the serving cell of the specified relay terminal device being identical to a serving cell of the remote terminal device.

Alternatively, the network device can determine the specified cell list according to the protocol, or can determine the specified cell list according to the serving cell where the remote terminal device is currently located.

Alternatively, the network device can determine the base station to which the serving cell where the remote terminal is currently located belongs firstly, and then determine each cell covered by the base station as a cell included in the specified cell list.

The information of the serving cell of the specified relay terminal device being changed means that the serving cell of the relay terminal device is changed, or the changed serving cell of the relay terminal device is not included in the specified cell list, which is not limited in the disclosure.

For example, if the remote terminal device determines that any reported serving cell of the relay terminal device has changed, for example, from serving cell A to serving cell B, the remote terminal device may send the first indication information to the network device.

Alternatively, if the remote terminal device determines that any reported serving cell of the relay terminal device that has been changed is not included in the specified cell list, the relay terminal device may send the first indication information to the network device. For example, the specified cell list includes serving cell A and serving cell B, and when the relay terminal device switches from serving cell A to serving cell C, the remote terminal device is required to send the first indication information to the network device.

At step 72, second indication information is sent to the remote terminal device, in which the second indication information is configured to indicate a trigger condition for sending the first indication information.

Alternatively, the network device can send, via a broadcast signaling, the second indication information to the remote terminal device; or send, via an RRC message, the second indication information to the remote terminal device.

In the disclosure, in order to prevent the first indication information sent by the remote terminal device from occupying excessive resources, the network device may instruct the remote terminal device to send the first indication information only after the trigger condition is satisfied.

At step 73, the first indication information sent by the remote terminal device is received, in which the first indication information is configured to indicate the information of the specified relay terminal device.

Regarding the specific implementation form of the step 73, reference may be made to detailed descriptions of other embodiments of the disclosure, which will not be repeated in detail herein.

By implementing the embodiments of the disclosure, the network device determines the trigger condition according to the protocol, and sends the second indication information indicating the trigger condition for sending the first indication information to the remote terminal device, and then receives the first indication information sent by the remote terminal device. In this way, the network device may configure the relay terminal device whose serving cell is identical to the serving cell of the remote terminal device for the remote terminal device according to the information of the specified relay terminal device sent by the remote terminal device, so that the remote terminal device is always connected to the network device through the relay terminal device whose serving cell is identical to the serving cell where the remote terminal device is located, thereby ensuring the service continuity of the remote terminal device.

Figure 8:
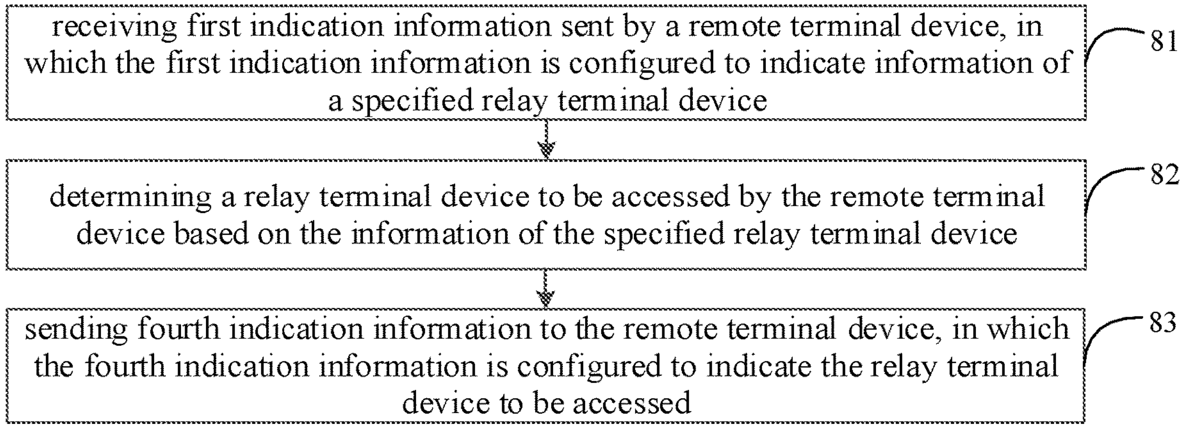
FIG. 8 is a flowchart of a method for reporting a measurement of a relay terminal device executed by a network device according to an embodiment of the disclosure.

As illustrated in FIG. 8, FIG. 8 is a flowchart of a method for reporting a measurement of a relay terminal device according to an embodiment of the disclosure. The method is executed by a network device. As illustrated in FIG. 8, the method includes, but is not limited to the following steps.

At step 81, first indication information sent by a remote terminal device is received, in which the first indication information is configured to indicate information of a specified relay terminal device.

Regarding the specific implementation form of the step 81, reference may be made to detailed descriptions of other embodiments of the disclosure, which will not be repeated in detail herein.

At step 82, a relay terminal device to be accessed by the remote terminal device is determined according to the information of the specified relay terminal device.

After receiving the first indication information sent by the remote terminal device, the network device determines the relay terminal device to be accessed by the remote terminal device according to the information of the specified relay terminal device indicated in the first indication information.

The information of the specified relay terminal device can be the ID of the relay terminal device whose serving cell is the same as the serving cell of the remote terminal device selected by the remote terminal device, and the network device may directly determine the relay terminal device to be accessed by the remote terminal device according to the ID of the relay terminal device.

Alternatively, the information of the specified relay terminal device may be the information of the serving cell of each relay terminal device measured by the remote terminal device, and the network device may screen out the relay terminal device whose serving cell is the same as that of the remote terminal device according to the information of the serving cell of each relay terminal device, to further determine the relay terminal device to be accessed by the remote terminal device.

At step 83, fourth indication information is sent to the remote terminal device, in which the fourth indication information is configured to indicate the relay terminal device to be accessed.

By implementing the embodiments of the disclosure, after receiving the first indication information sent by the remote terminal device, the network device determines the relay terminal device to be accessed by the remote terminal device according to the information of the specified relay terminal device, and sends the fourth indication information for indicating the relay terminal device to be accessed to the remote terminal device. In this way, the network device configures the relay terminal device whose serving cell is identical to the serving cell of the remote terminal device for the remote terminal device according to the information of the specified relay terminal device sent by the remote terminal device, so that the remote terminal device is always connected to the network device through the relay terminal device whose serving cell is identical to the serving cell where the remote terminal device is located, thereby ensuring the service continuity of the remote terminal device.

Figure 9:
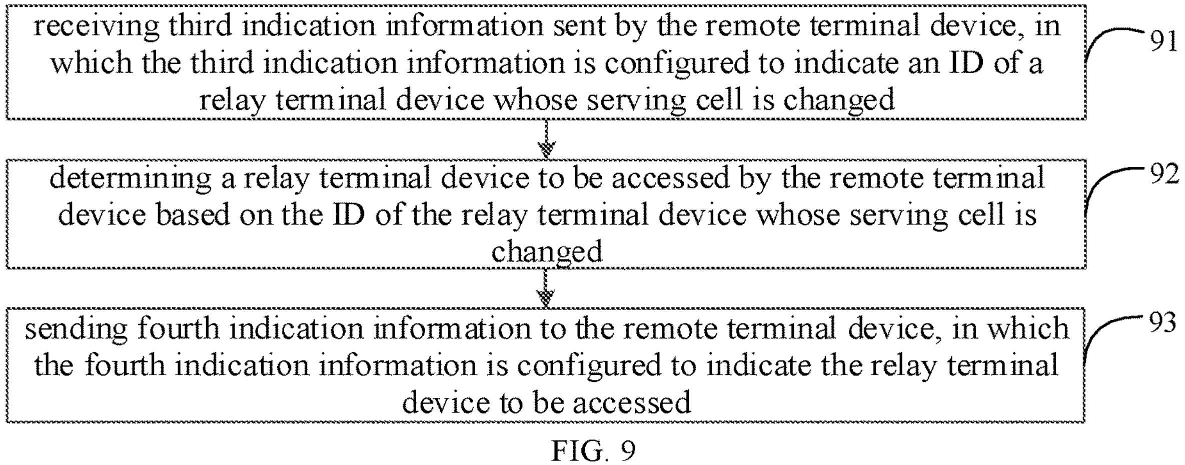
FIG. 9 is a flowchart of a method for reporting a measurement of a relay terminal device according to an embodiment of the disclosure.

As illustrated in FIG. 9, FIG. 9 is a flowchart of a method for reporting a measurement of a relay terminal device according to an embodiment of the disclosure. The method is executed by a network device. As illustrated in FIG. 9, the method includes, but is not limited to the following steps.

At step 91, third indication information sent by a remote terminal device is received, in which the third indication information is configured to indicate an ID of a relay terminal device whose serving cell is changed.

At step 92, a relay terminal device to be accessed by the remote terminal device is determined according to the ID of the relay terminal device whose serving cell is changed.

After receiving the third indication information sent by the remote terminal device, the network device may update the information of the specified relay terminal device indicated in the previously received first indication information according to the ID of the relay terminal device whose serving cell is changed as indicated in the third indication information, and determine the relay terminal device to be accessed by the remote terminal device by using the updated information of the specified relay terminal device.

It is understood that the network device determines the relay terminal device to be accessed by the remote terminal device according to the ID of the relay terminal device whose serving cell is changed, to ensure that the information of the relay terminal device on the network device side is the same as the information on the remote terminal device side, so that the relay terminal device to be accessed by the remote terminal device can be determined more accurately according to the information of the relay terminal device.

At step 93, fourth indication information is sent to the remote terminal device, in which the fourth indication information is configured to indicate the relay terminal device to be accessed.

Regarding the specific implementation form of the step 93, reference may be made to detailed descriptions of other embodiments of the disclosure, which will not be repeated in detail herein.

By implementing the embodiments of the disclosure, after receiving the third indication information sent by the remote terminal device, the network device determines the relay terminal device to be accessed by the remote terminal device according to the ID of the relay terminal device whose serving cell is changed as indicated in the third indication information, and sends the fourth indication information for indicating the relay terminal device to be accessed to the remote terminal device. In this way, when the serving cell of the relay terminal device is changed, the network device can more accurately determine the relay terminal device to be accessed by the remote terminal device according to the indication information sent by the remote terminal device, thereby ensuring the service continuity of the remote terminal device.

In the above embodiments of the disclosure, the methods according to the embodiments of the disclosure are described from the perspectives of the network device and the remote terminal device, respectively. In order to realize each of the functions in the methods according to the above embodiments of the disclosure, the network device and the terminal device may include a hardware structure, a software module, and realize each of the above functions in the form of hardware structure, software module, or a combination of hardware structure and software module. A certain function of the above functions may be performed in the form of hardware structure, software module, or a combination of hardware structure and software module.

Figure 10:
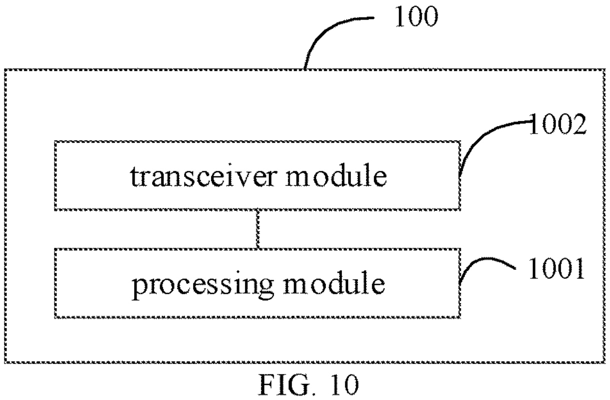
FIG. 10 is a block diagram of a communication apparatus according to an embodiment of the disclosure.

As illustrated in FIG. 10, FIG. 10 is a block diagram of a communication apparatus 100 according to an embodiment of the disclosure. The communication apparatus 100 shown in FIG. 10 may include a processing module 1001 and a transceiver module 1002.

The transceiver module 1002 may include a transmitting module and/or a receiving module. The transmitting module is configured to realize a transmitting function, and the receiving module is configured to realize a receiving function. The transceiver module 1002 can realize the transmitting function and/or receiving function.

It is understood that the communication apparatus 100 may be a remote terminal device, an apparatus in the remote terminal device, or an apparatus capable of being used in combination with the remote terminal device.

The communication apparatus 100 is applied to the terminal device side. The apparatus includes:

the transceiver module 1002, configured to send first indication information to a network device, in which the first indication information is configured to indicate information of a specified relay terminal device.

In an embodiment, the communication apparatus 100 further includes:

the processing module 1001, configured to determine the information of the specified relay terminal device based on a discovery signal.

In an embodiment, the transceiver module 1002 is further configured to:

in response to a trigger condition being satisfied, send the first indication information to the network device.

In an embodiment, the trigger condition includes: a specified transmission cycle, and/or, detection of a trigger event.

In an embodiment, the trigger event includes at least one of:

a RSRP of a discovery signal being greater than a first threshold;

a RSRP of a sidelink communication signal being greater than a second threshold;

information of a serving cell of the specified relay terminal device being changed;

the serving cell of the specified relay terminal device being included in a specified cell list; or the serving cell of the specified relay terminal device being identical to a serving cell of the remote terminal device.

In an embodiment, the processing module 1001 is further configured to:

determine the specified cell list based on a protocol; or determine the specified cell list based on a serving cell where the remote terminal device is currently located; or determine the specified cell list based on an instruction of the network device.

In an embodiment, the processing module 1001 is further configured to:

determine a base station to which the serving cell where the remote terminal device is currently located belongs; and determine each cell covered by the base station as a cell included in the specified cell list.

In an embodiment, the processing module 1001 is further configured to:

determine the trigger condition based on the protocol; or determine the trigger condition based on second indication information sent by the network device.

In an embodiment, the transceiver module 1002 is further configured to:

receive, via a broadcast signaling, the second indication information sent by the network device; or receive, via a RRC message, the second indication information sent by the network device.

In an embodiment, the information of the specified relay terminal device includes at least one of:

an ID of a relay terminal device;

an ID of a serving cell of the relay terminal device;

information on whether a serving cell of the relay terminal device is identical to a serving cell of the remote terminal device; or a measurement result of the relay terminal device.

In an embodiment, the ID of the serving cell includes at least one of:

an ID of a cell where a relay terminal device in an idle state or an inactive state resides; or an ID of a cell connected to a relay terminal device in a connected state.

In an embodiment, the transceiver module 1002 is further configured to:

send third indication information to the network device, in which the third indication information is configured to indicate an ID of a relay terminal device whose serving cell is changed.

In an embodiment, the transceiver module 1002 is further configured to:

receive fourth indication information sent by the network device, in which the fourth indication information is configured to indicate a relay terminal device to be accessed.

With the communication apparatus of the disclosure, the remote terminal device sends the first indication information to the network device. The first indication information is used to indicate the information of the specified relay terminal device. In this way, the remote terminal device sends the information of the specified relay terminal device to the network device, so that the serving cell of the target relay terminal device configured by the network device for the remote terminal device is the same as the serving cell of the remote terminal device, thus ensuring service continuity of the remote terminal device.

It is understood that the communication apparatus 100 may be a network device, an apparatus in the network device, or an apparatus capable of being used in combination with the network device.

The communication apparatus 100 is applied to a network device side. The apparatus includes:

the transceiver module 1002, configured to receive first indication information sent by a remote terminal device, in which the first indication information is configured to indicate information of a specified relay terminal device.

In an embodiment, the transceiver module 1002 is further configured to:

send second indication information to the remote terminal device, in which the second indication information is configured to indicate a trigger condition for sending the first indication information.

In an embodiment, the trigger condition includes: a specified transmission cycle, and/or, detection of a trigger event.

In an embodiment, the trigger event includes at least one of:

a RSRP of a discovery signal being greater than a first threshold;

a RSRP of a sidelink communication signal being greater than a second threshold;

information of a serving cell of the specified relay terminal device being changed;

the serving cell of the specified relay terminal device being included in a specified cell list; or the serving cell of the specified relay terminal device being identical to a serving cell of the remote terminal device.

In an embodiment, the apparatus further includes the processing module 1001, configured to:

determine the specified cell list based on a protocol; or determine the specified cell list based on a serving cell where the remote terminal device is currently located.

In an embodiment, the processing module 1001 is further configured to:

determine a base station to which the serving cell where the remote terminal device is currently located belongs; and determine each cell covered by the base station as a cell included in the specified cell list.

In an embodiment, the processing module 1001 is further configured to:

determine the trigger condition based on the protocol.

In an embodiment, the transceiver module 1002 is further configured to:

send, via a broadcast signaling, the second indication information to the remote terminal device;

or send, via a RRC message, the second indication information to the remote terminal device.

In an embodiment, the information of the specified relay terminal device includes at least one of:

an ID of a relay terminal device;

an ID of a serving cell of the relay terminal device;

information on whether the serving cell of the relay terminal device is identical to a serving cell of the remote terminal device; or a measurement result of the relay terminal device.

In an embodiment, the ID of the serving cell includes at least one of:

an ID of a cell where a relay terminal device in an idle state or an inactive state resides; or an ID of a cell connected to a relay terminal device in a connected state.

In an embodiment, the transceiver module 1002 is further configured to:

receive third indication information sent by the remote terminal device, in which the third indication information is configured to indicate an ID of a relay terminal device whose serving cell is changed.

In an embodiment, the processing module 1001 is further configured to:

determine a relay terminal device to be accessed by the remote terminal device based on the information of the specified relay terminal device; and the transceiver module 1002 is further configured to: send fourth indication information to the remote terminal device, in which the fourth indication information is configured to indicate the relay terminal device to be accessed.

With the communication apparatus of the disclosure, the network device receives the first indication information sent by the remote terminal device. The first indication information is used to indicate the information of the specified relay terminal device. In this way, the network device may configure a relay terminal device whose serving cell is identical to its own serving cell for the remote terminal device according to the information of the specified relay terminal device sent by the remote terminal device, so that the remote terminal device is always connected to the network device through the relay terminal device whose serving cell is identical to the serving cell where the remote terminal device is located, thereby ensuring the service continuity of the remote terminal device.

Figure 11:
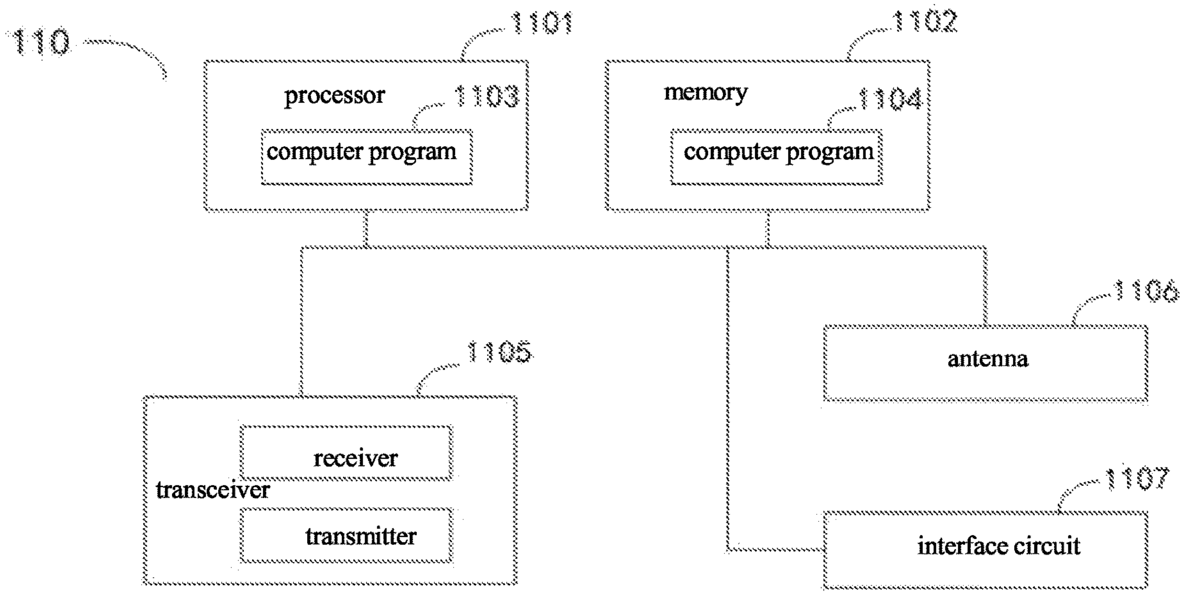
FIG. 11 is a block diagram of a communication apparatus according to an embodiment of the disclosure.

As illustrated in FIG. 11, FIG. 11 is a block diagram of a communication apparatus 110 of an embodiment of the disclosure. The communication apparatus 110 may be a network device or a terminal device, or may be a chip, a chip system or a processor that supports the network device to realize the above-described methods, or may be a chip, a chip system or a processor that supports the terminal device to realize the above-described methods. The apparatus may be used to realize the methods described in the above method embodiments with reference to the description of the above-described method embodiments.

The communication apparatus 110 may include one or more processors 1101. The processor 1101 may be a general purpose processor or a dedicated processor, such as, a baseband processor and a central processor. The baseband processor is used for processing communication protocols and communication data. The central processor is used for controlling the communication apparatus (e.g., a base station, a baseband chip, a terminal device, a terminal device chip, a DU, or a CU), executing computer programs, and processing data of the computer programs.

In an embodiment, the communication apparatus 110 may include one or more memories 1102 on which computer programs 1104 may be stored. The processor 1101 executes the computer programs 1104 to cause the communication apparatus 110 to perform the methods described in the above method embodiments. In an embodiment, the memory 1102 may also store data. The communication apparatus 110 and the memory 1102 may be provided separately or may be integrated together.

In an embodiment, the communication apparatus 110 may also include a transceiver 1105 and an antenna 1106. The transceiver 1105 may be referred to as a transceiver unit, a transceiver machine, or a transceiver circuit, for realizing a transceiver function. The transceiver 1105 may include a receiver and a transmitter. The receiver may be referred to as a receiving machine or a receiving circuit, for realizing the receiving function. The transmitter may be referred to as a transmitter machine or a transmitting circuit, for realizing the transmitting function.

In an embodiment, the communication apparatus 110 may also include one or more interface circuits 1107. The interface circuits 1107 are used to receive code instructions and transmit them to the processor 1101. The processor 1101 runs the code instructions to cause the communication apparatus 110 to perform the method described in the method embodiments.

The communication apparatus 110 is a remote terminal device. The processor 1101 is used to perform step 31 in FIG. 3, and step 41 and step 42 in FIG. 4. The transceiver 1105 is used to perform step 21 in FIG. 2, step 32 in FIG. 3, and step 41, step 42 and step 43 in FIG. 4, or step 51 and step 52 in FIG. 5.

The communication apparatus 110 is a network device. The processor 1101 is used to perform step 71 in FIG. 7, and step 82 in FIG. 8, or step 92 in FIG. 9. The transceiver 1105 is used to perform step 61 in FIG. 6, step 72 and step 73 in FIG. 7, and step 81 and step 83 in FIG. 8, or step 91 and step 93 in FIG. 9.

In an implementation, the processor 1101 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 1101 may store a computer program 1103. When the computer program 1103 runs on the processor 1101, the communication apparatus 110 is caused to perform the methods described in the method embodiments above. The computer program 1103 may be solidified in the processor 1101, and in such case the processor 1101 may be implemented by hardware.

In an implementation, the communication apparatus 110 may include circuits. The circuits may implement the sending, receiving or communicating function in the preceding method embodiments. The processor and the transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication apparatus in the description of the above embodiments may be a network device or a terminal device, but the scope of the communication apparatus described in the disclosure is not limited thereto, and the structure of the communication apparatus may not be limited by FIG. 11. The communication apparatus may be a stand-alone device or may be part of a larger device. For example, the described communication apparatus may be:

(1) a stand-alone IC, a chip, a chip system or a subsystem;
(2) a collection of ICs including one or more ICs, in an embodiment, the collection of ICs may also include storage components for storing data and computer programs;
(3) an ASIC, such as a modem;
(4) a module that can be embedded within other devices;
(5) a receiver, a terminal device, a smart terminal device, a cellular phone, a wireless device, a handheld machine, a mobile unit, an in-vehicle device, a network device, a cloud device, an artificial intelligence device, and the like; and
(6) others.

Figure 12:
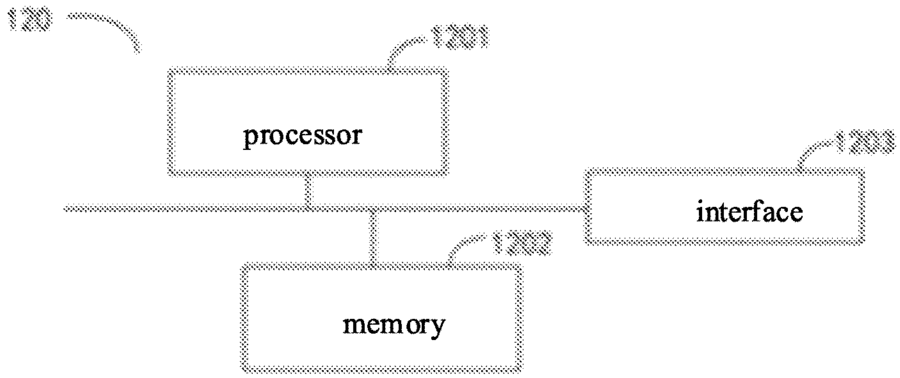
FIG. 12 is a block diagram of a chip according to an embodiment of the disclosure.

The case where the communication apparatus may be a chip or a chip system is described with reference to the schematic structure of the chip shown in FIG. 12. The chip shown in FIG. 12 includes a processor 1201 and an interface 1202. There may be one or more processors 1201, and there may be multiple interfaces 1202.

In cases where the chip is used to implement the function of the remote terminal device in the embodiment of the disclosure:

the interface 1202 is used to perform step 42 of FIG. 4, step 44 of FIG. 4 or step 52 of FIG. 5.

In cases where the chip is used to implement the function of the network device in the embodiment of the disclosure:

the interface 1202 is used to perform step 61 of FIG. 6, step 73 of FIG. 7, step 81 of FIG. 8 or step 91 of FIG. 9.

In an embodiment, the chip further includes a memory 1203 used to store necessary computer programs and data.

It is understood by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of the embodiments of the disclosure.

The embodiments of the disclosure also provide a communication system. The communication system includes a communication apparatus acting as a terminal device and a communication apparatus acting as a network device in the preceding embodiment of FIG. 11, or the system includes a communication apparatus acting as a terminal device and a communication apparatus acting as a network device in the preceding embodiment of FIG. 12.

The disclosure also provides a computer-readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The above embodiments may be implemented in whole or in part by software, hardware, firmware, or any combination thereof. When implemented using software, the above embodiments may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., using coaxial cables, fiber optics, or digital subscriber lines (DSLs) or wireless manner (e.g., using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of the embodiments of the disclosure, or used to indicate the order of precedence.

The term “at least one” in the disclosure may also be described as one or more, and the term “multiple” may be two, three, four, or more, which is not limited in the disclosure. In the embodiments of the disclosure, for a type of technical features, “first”, “second”, and “third”, and “A”, “B”, “C” and “D” are used to distinguish different technical features of the type, the technical features described using the “first”, “second”, and “third”, and “A”, “B”, “C” and “D” do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the titles of the above tables may be other names that can be understood by the communication apparatus, and the values or representations of the parameters may be other values or representations that can be understood by the communication apparatus. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-fire.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A method for reporting information of a relay terminal device, performed by a remote terminal device, and comprising:

determining information of a specified relay terminal device based on a discovery signal;

receiving, via a radio resource control (RRC) message, second indication information sent by a network device;

determining a trigger condition based on the second indication information sent by the network device;

determining that the trigger condition is satisfied, and sending first indication information to the network device, wherein the first indication information is configured to indicate the information of the specified relay terminal device;

wherein the trigger condition comprises detection of a trigger event;

wherein the trigger event comprises: a reference signal receiving power (RSRP) of the discovery signal being greater than a first threshold; or a RSRP of a sidelink communication signal being greater than a second threshold;

wherein the information of the specified relay terminal device comprises an identification (ID) of a relay terminal device, an ID of a serving cell of the relay terminal device and a measurement result of the relay terminal device;

wherein the ID of the serving cell comprises: an ID of a cell where a relay terminal device in an idle state resides; or an ID of a cell where a relay terminal device in an inactive state resides.

2. The method of claim 1, wherein the trigger condition further comprises a specified transmission cycle.

3. The method of claim 1, wherein the trigger event further comprises at least one of:

information of a serving cell of the specified relay terminal device being changed;

the serving cell of the specified relay terminal device being included in a specified cell list; or the serving cell of the specified relay terminal device being identical to a serving cell of the remote terminal device;

wherein the information of the serving cell of the specified relay terminal device being changed comprises: the serving cell of the relay terminal device being changed, or a changed serving cell of the relay terminal device not being included in the specified cell list.

4. The method of claim 3, further comprising one of the following:

determining the specified cell list based on a protocol;

determining the specified cell list based on a serving cell where the remote terminal device is currently located; or determining the specified cell list based on an instruction of the network device.

5. The method of claim 4, wherein determining the specified cell list based on the serving cell where the remote terminal device is currently located, comprises:

determining a base station to which the serving cell where the remote terminal device is currently located belongs; and determining each cell covered by the base station as a cell included in the specified cell list.

6. The method of claim 1, wherein the information of the specified relay terminal device further comprises:

information on whether the serving cell of the relay terminal device is identical to a serving cell of the remote terminal device;

wherein whether the serving cell of the relay terminal device is identical to the serving cell of the remote terminal device is indicated by identifier information;

wherein the ID of the serving cell further comprises:

an ID of a cell connected to a relay terminal device in a connected state;

wherein the ID of the relay terminal device is selected by the remote terminal device from IDs of serving cells of multiple relay terminal devices, and the relay terminal device and the remote terminal device are in a same serving cell.

7. The method of claim 1, further comprising:

sending third indication information to the network device, wherein the third indication information is configured to indicate an ID of a relay terminal device whose serving cell is changed.

8. The method of claim 1, further comprising:

receiving fourth indication information sent by the network device, wherein the fourth indication information is configured to indicate a relay terminal device to be accessed.

9. The method of claim 1, wherein the discovery signal of the relay terminal device carries the ID of the serving cell of the relay terminal device.

10. A method for receiving information of a relay terminal device, performed by a network device, comprising:

sending, via a radio resource control (RRC) message, second indication information to a remote terminal device, wherein the second indication information is configured to indicate a trigger condition for sending first indication information;

receiving the first indication information sent by the remote terminal device, wherein the first indication information is configured to indicate information of a specified relay terminal device, and the information of the specified relay terminal device is determined based on a discovery signal;

wherein the trigger condition comprises detection of a trigger event;

wherein the trigger event comprises: a reference signal receiving power (RSRP) of the discovery signal being greater than a first threshold; or a RSRP of a sidelink communication signal being greater than a second threshold;

wherein the information of the specified relay terminal device comprises an identification (ID) of a relay terminal device, an ID of a serving cell of the relay terminal device and a measurement result of the relay terminal device;

wherein the ID of the serving cell comprises: an ID of a cell where a relay terminal device in an idle state resides; or an ID of a cell where a relay terminal device in an inactive state resides.

11. The method of claim 10, wherein the trigger condition further comprises a specified transmission cycle.

12. The method of claim 10, wherein the trigger event further comprises at least one of:

information of a serving cell of the specified relay terminal device being changed;

the serving cell of the specified relay terminal device being included in a specified cell list; or the serving cell of the specified relay terminal device being identical to a serving cell of the remote terminal device;

wherein the information of the serving cell of the specified relay terminal device being changed comprises: the serving cell of the relay terminal device being changed, or a changed serving cell of the relay terminal device not being included in the specified cell list.

13. The method of claim 12, further comprising one of the followings:

determining the specified cell list based on a protocol; or determining the specified cell list based on a serving cell where the remote terminal device is currently located.

14. The method of claim 13, wherein determining the specified cell list based on the serving cell where the remote terminal device is currently located, comprises:

determining a base station to which the serving cell where the remote terminal device is currently located belongs; and determining each cell covered by the base station as a cell included in the specified cell list.

15. The method of claim 10, wherein the information of the specified relay terminal device further comprises:

information on whether the serving cell of the relay terminal device is identical to a serving cell of the remote terminal device;

wherein whether the serving cell of the relay terminal device is identical to the serving cell of the remote terminal device is indicated by identifier information;

wherein the ID of the serving cell further comprises:

an ID of a cell connected to a relay terminal device in a connected state;

wherein the ID of the relay terminal device is selected by the remote terminal device from IDs of serving cells of multiple relay terminal devices, and the relay terminal device and the remote terminal device are in a same serving cell.

16. The method of claim 10, further comprising:

receiving third indication information sent by the remote terminal device, wherein the third indication information is configured to indicate an ID of a relay terminal device whose serving cell is changed.

17. The method of claim 10, further comprising:

determining a relay terminal device to be accessed by the remote terminal device based on the information of the specified relay terminal device; and sending fourth indication information to the remote terminal device, wherein the fourth indication information is configured to indicate the relay terminal device to be accessed.

18. A communication apparatus, comprising a processor, and a memory having computer programs stored thereon, wherein when the computer programs are executed by the processor, the device is caused to implement the method of claim 10.

19. The method of claim 10, wherein the discovery signal of the relay terminal device carries the ID of the serving cell of the relay terminal device.

20. A communication apparatus, comprising a processor, and a memory having computer programs stored thereon, wherein when the computer programs are executed by the processor, the communication apparatus is caused to perform:

determining information of a specified relay terminal device based on a discovery signal;

receiving, via a radio resource control (RRC) message, second indication information sent by a network device;

determining a trigger condition based on the second indication information sent by the network device;

determining that the trigger condition is satisfied, and sending first indication information to the network device, wherein the first indication information is configured to indicate the information of the specified relay terminal device;

wherein the trigger condition comprises detection of a trigger event;

wherein the trigger event comprises: a reference signal receiving power (RSRP) of the discovery signal being greater than a first threshold; or a RSRP of a sidelink communication signal being greater than a second threshold;

wherein the information of the specified relay terminal device comprises an identification (ID) of a relay terminal device, an ID of a serving cell of the relay terminal device and a measurement result of the relay terminal device;

wherein the ID of the serving cell comprises: an ID of a cell where a relay terminal device in an idle state resides; or an ID of a cell where a relay terminal device in an inactive state resides.

* * * * *